United States Patent [19]

Potter

[11] Patent Number: 4,470,936
[45] Date of Patent: Sep. 11, 1984

[54] METHOD AND APPARATUS FOR COINJECTING TWO THERMOPLASTIC MATERIALS

[75] Inventor: Terry C. Potter, Sylvania, Ohio

[73] Assignee: Owens-Illinois, Inc., Toledo, Ohio

[21] Appl. No.: 426,473

[22] Filed: Sep. 29, 1982

[51] Int. Cl.³ .................. B29D 27/00; B29F 1/03; B29F 1/08
[52] U.S. Cl. .................. 264/39; 264/45.1; 264/46.4; 264/46.9; 264/250; 264/255; 264/328.8; 264/DIG. 83; 425/548; 425/563; 425/573; 425/DIG. 229
[58] Field of Search .......... 264/45.1, DIG. 83, 39, 264/46.4, 46.9, 250, 255, 328.8; 425/548, 563, 573, DIG. 229

[56] References Cited

U.S. PATENT DOCUMENTS

| | | | |
|---|---|---|---|
| 3,599,290 | 8/1971 | Garner | 264/DIG. 83 |
| 3,793,410 | 2/1974 | Garner | 264/DIG. 83 |
| 3,809,733 | 5/1974 | Sandiford et al. | 264/DIG. 83 |
| 3,873,656 | 3/1975 | Garner | 264/45.1 X |
| 3,966,372 | 6/1976 | Yasuike et al. | 264/45.1 X |
| 4,014,966 | 3/1977 | Hanning | 264/45.1 |
| 4,104,353 | 8/1978 | Monnet | 264/45.1 X |
| 4,124,308 | 11/1978 | Sokolow | 264/45.1 X |

Primary Examiner—Philip E. Anderson
Attorney, Agent, or Firm—John R. Nelson; Myron E. Click

[57] ABSTRACT

Hot runner injection molding apparatus for coinjecting two thermoplastic materials sequentially through separate channels to form at least a two-layer sandwich material is provided. There is a valve means for instantaneously switching the flow of thermoplastic material from one channel to the other channel, the valve means preferably comprising a shuttle ball member.

17 Claims, 4 Drawing Figures

METHOD AND APPARATUS FOR COINJECTING TWO THERMOPLASTIC MATERIALS

The present invention relates to a hot runner coinjection molding apparatus for coinjecting two thermoplastic materials to form at least a two-layer sandwich material.

The present invention also relates to a method for coinjecting two thermoplastic materials sequentially through separate channels to provide a two-layer sandwich material.

It is an object of the present invention to provide an efficient and effective coinjection molding apparatus for coinjecting two thermoplastic materials sequentially through separate channels to form at least a two-layer sandwich material, each channel being independently heated and having an exit end in communication with an exit cavity with a common gate entrance to a forming mold, there being a valve means preferably comprising a shuttle ball for instaneously switching the flow of molten thermoplastic materials from one channel to the other channel without intermixing materials.

It is also an object of the present invention to provide a method of coinjecting two thermoplastic materials to form a two or more layer member using a twin unit injection molding machine in conjunction with a hot runner system with two separate channels, one channel for each material, each channel having an exit that opens into a common exit cavity having a common gate entrance to an injection mold, the method comprising the steps of:
A. heating the thermoplastic materials in the two channels;
B. injecting material from the first channel through the common gate into the mold;
C. simultaneously forcing a shuttle valve member to seat itself in the exit end of the second channel to prevent intermixing of the two materials;
D. sequentially injecting material from the second channel through the common gate into the mold;
E. simultaneously stopping the flow of the first material into the common exit cavity by forcing the valve member into the exit end of the first channel to seat itself therein; and
F. simultaneously cleaning the first material from the common exit cavity and the gate entrance.

These and other objects will be apparent from the specification that follows, the appended claims and the drawings in which:

Figure 3:
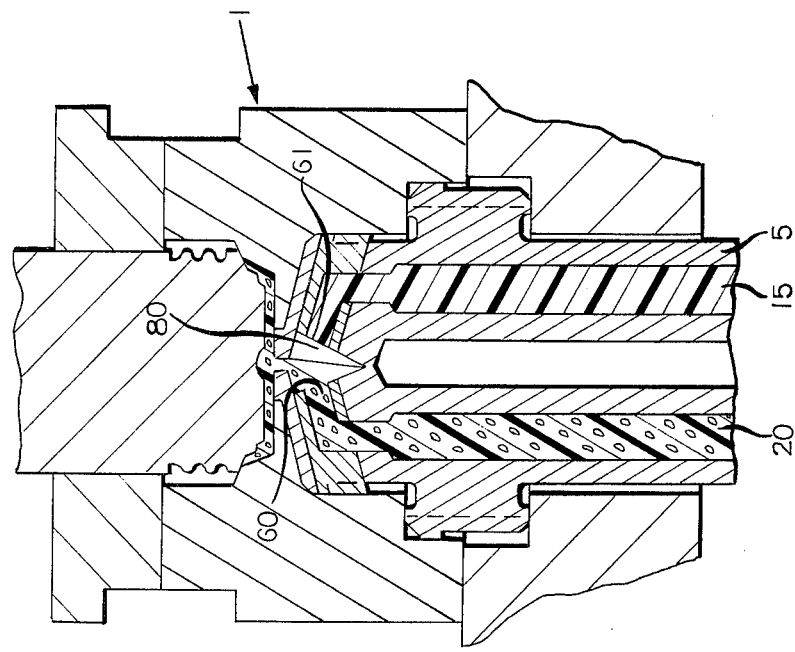
Figure 4:
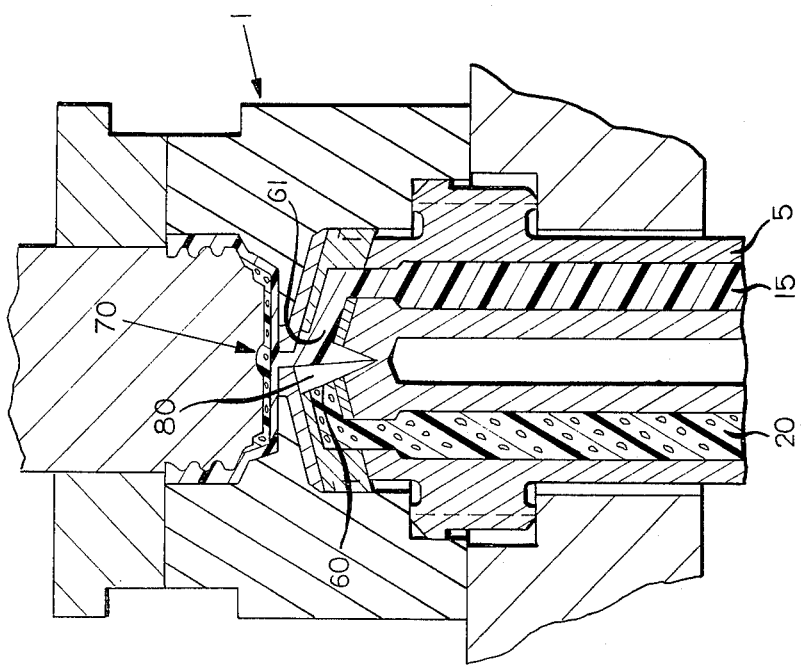

FIG. 3 is another embodiment of the coinjection molding hot runner assembly of the present invention showing swing gate valve means for stopping the flow in one channel and also cleaning the gate entrance and common exit cavity at the same time; and FIG. 4 is a fragmentary sectional view of the apparatus of FIG. 3 showing the injection of the second thermoplastic material in the second channel to provide a two-layer sandwich material.

The present invention provides an efficient and effective coinjection molding apparatus and method for sequentially injecting two thermoplastic materials, there being an instantaneous switch in flow from one melt channel to the other. No prepurging of the gate area is necessary because of the cleaning action of the shuttle valve member, this valve member being of simple construction and low cost. The apparatus is also completely internally self-contained and requires no additional outside mechanism to effect the valve shifting. Also, there is a small dependable compact design in the apparatus that lends itself to large scale up or scale down for large moldings or for miniaturization.

The present invention provides an outstanding hot runner coinjection molding apparatus for coinjecting two thermoplastic materials sequentially through separate channels to form at least a two-layer sandwich material each channel being independently heated and each channel having an exit end in communication with an exit cavity with a common gate entrance to a forming mold, there being a valve means for instantaneously switching the flow of thermoplastic material from one channel to the other channel without intermixing materials from the two channels, the valve means comprising a shuttle member that removes residual material from the gate entrance and seats in the exit end of the one channel as material flows through the exit end of the other channel whereby the materials are cleanly and sequentially injected into the forming mold.

The present invention also provides an efficient, effective method of coinjecting two thermoplastic materials to form a two or more layer member using a twin unit injection molding machine with two separate channels, one channel for each material, each channel having an exit end that opens into a common exit cavity having a common gate entrance to an injection mold, the method comprising the steps of:
A. heating the thermoplastic materials in the two channels;
B. injecting material from the first channel through the common gate into the injection mold;
C. simultaneously forcing a valve member to seat itself in the exit end of the second channel to prevent intermixing of the two materials;
D. sequentially injecting material from the second channel into the gate entrance;
E. simultaneously stopping the flow of material from the first channel into the common exit cavity by forcing the valve member into the exit end of the first channel to seat itself therein; and
F. simultaneously cleaning the first material from the exit cavity and the common gate entrance.

In one embodiment of the present invention, outstanding two-layer sandwich materials are made in which one of the thermoplastic materials is a foamed material. A preferred sandwich material of the present invention is one in which the first thermoplastic material is a copolymer of ethylene and vinyl acetate and the second thermoplastic material is polypropylene. The apparatus of the present invention is advantageously provided with means for independently heating the two channels, the heating means being located between and around the two channels along with appropriate thermocouples for accurate temperature control.

The apparatus of the present invention preferably has a shuttle ball for the shuttle member, although good results can be obtained with the swing gate member shown in the second embodiment.

In the present invention, there is provided an outstanding method of forming a closure by directing the first thermoplastic material into the mold to form a closure liner and directing the second thermoplastic material from the second channel into the forming mold to form a thermoplastic shell for the closure.

The method of the present invention directed to making foam cores provides the steps of:

A. directing the first thermoplastic material into a mold to form an outer layer of the final article;

B. directing the injection of a second foamed thermoplastic core material from the second channel into the mold to form a foamed core article; and C. directing the first thermoplastic material into the mold to form a layer and seal off the foamed material at the gate to form the final article.

The present invention further provides means for molding the two thermoplastic materials into a two-piece closure, the one material forming a closure shell and the other thermoplastic material, which may be a foamed material, forming a liner therefor.

Figure 1:
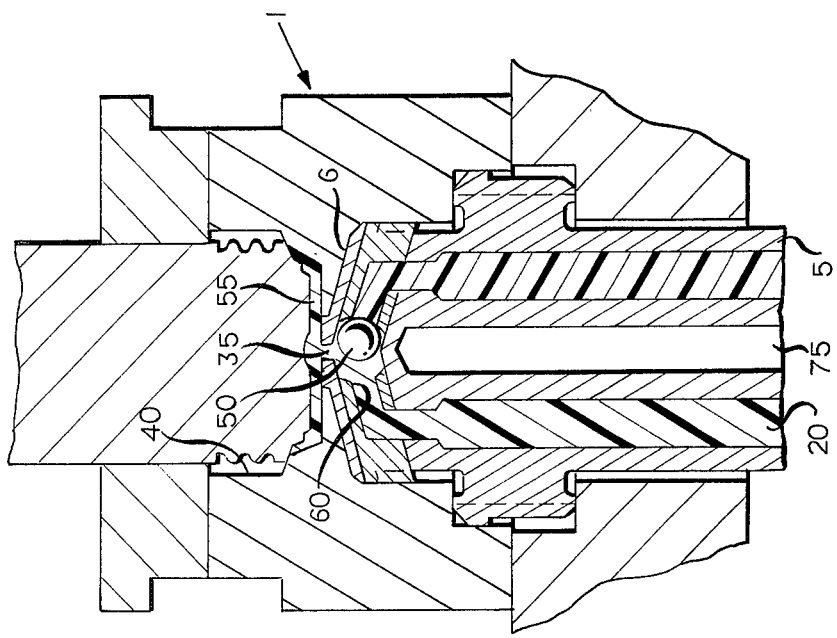
FIG. 1 is a fragmentary cross-sectional view of the coinjection molding hot runner assembly of the present invention with two separate channels showing thermoplastic material being injected through the first of the two channels.
Figure 2:
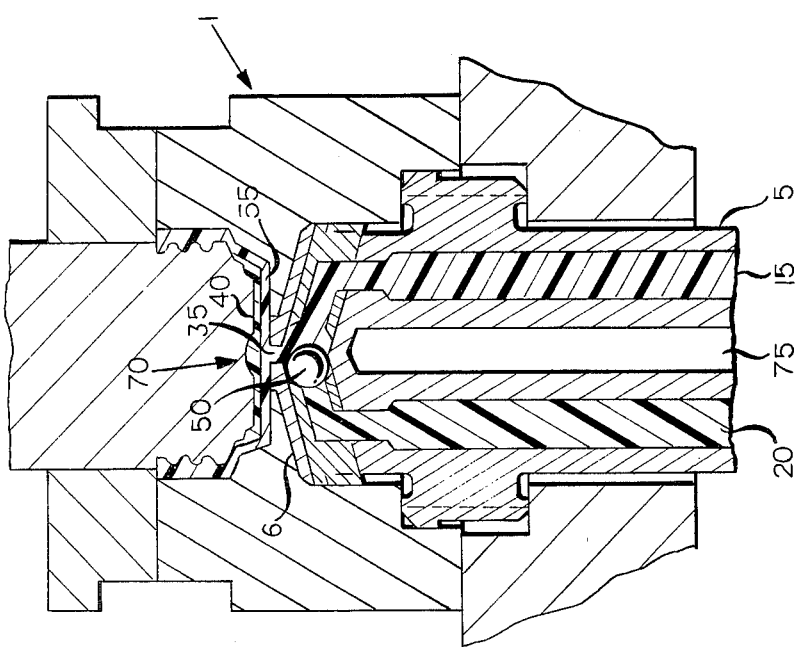
FIG. 2 is a fragmentary sectional view of the coinjection molding hot runner assembly showing the sequential injection of the second thermoplastic material through the second channel, there being shuttle ball valve means for switching the flow of the thermoplastic materials and at the same time cleaning the common gate entrance and the common exit cavity.

In the drawings and particularly FIGS. 1 and 2, there is shown a hot runner coinjection molding apparatus 1 comprising an injection molding housing 5 for the nozzle portion 6, the injection molding nozzle having two separate channels 15 and 20, each channel containing a thermoplastic material for forming a two-layer sandwich article. The channels 15 and 20 have a common exit cavity 30 and a common gate portion 35 for injecting into an injection mold 40. There is provided shuttle valve means 50, preferably comprising a shuttle ball, for instantaneously stopping the flow in one channel and commencing flow in the other channel. As seen in the drawings, as for instance in FIG. 1, the first thermoplastic material is injection molded through channel 20 into the mold to form a liner layer 55. The second thermoplastic material is injection molded through channel 15, such flow causing the shuttle valve 50 to flow to the other end of the exit cavity and seat itself in the valve seat 60. This action of moving from one side to the other of the exit cavity cleans the exit cavity from the common gate area and the material as seen in FIG. 2 from the second channel 15 is injection molded into the forming mold 40 to form layer 65, the two layers 55 and 65 forming an outstanding two-layer sandwich 70. As seen in the drawings, a cartridge heater means 75 is advantageously employed to heat the thermoplastic materials in each of the channels, the heat generally being applied to the channels between said channels and around said channels.

In FIGS. 3 and 4, another embodiment of the coinjection molding apparatus is shown. In this embodiment the apparatus and method of using the same is the same as that shown in FIGS. 1 and 2 except that the shuttle valve member is a swing gate 80 instead of a ball 50. As shown in FIG. 3, the first thermoplastic material is injected through channel 20 into the forming mold to form, for instance, a closure liner. The channel 15 is shut off because of the seating of the gate 80 in the valve seat 61 of that channel. As shown in FIG. 4, because of the increase in injection molding pressure in the channel 15 when its flow is commenced and the reduction of injection molding pressure in channel 20 as its flow ceases, the swing gate 80 is forced into the position shown in FIG. 4 in which the swing gate seats itself in the valve seat 60 of channel 20 thereby instantaneously and completely shutting off the flow of the material in the channel 20 and at the same time cleaning the exit cavity and common gate. The two-layer closure 70 is formed as in FIGS. 1 and 2 with the two layers defined in 60.

Hence the present invention can be used efficiently and effectively to form the two-layer sandwich materials including foamed core materials using a single shuttle ball valve or a single swing gate shuttle valve to direct and control the flow of two separate materials in an injection molding apparatus, such injection being sequential through a common gate. As previously indicated, there is no need for shut down for cleaning and purging, etc.

The apparatus shown in the drawings is such that the heating means provides accurate and independent temperature control of the two individual melt channels to provide an effective apparatus and method.

What is claimed is:

1. A method of coinjecting two thermoplastic materials to form a two or more layer member using a hot runner injection molding machine with two separate channels, one channel for each material, each channel having an exit end that opens into a common exit cavity having a common gate entrance to an injection mold, the method comprising of:

A. heating the thermoplastic materials in the two channels;

B. injecting material from the first channel through the common gate into the injection mold;

C. simultaneously forcing a valve member to seat itself in the exit end of the second channel to prevent intermixing of the two materials;

D. sequentially injecting material from the second channel through its exit end into the common exit cavity and into the common gate entrance;

E. simultaneously stopping the flow of material into the common exit cavity by forcing the valve member into the exit end of the first channel to seat itself therein; and F. simultaneously cleaning the first material from the exit cavity and the gate entrance by forcing the valve member and the first material into the exit end of the first channel.

2. A process as defined in claim 1 in which one of the thermoplastic materials is a foamed material.

3. A process as defined in claim 1 in which the first injected thermoplastic material is a copolymer of ethylene and vinylacetate and the second injected thermoplastic material is polypropylene.

4. A method as defined in claim 1 in which a copolymer ethylene and vinylacetate is first injection molded into the mold and thereafter a polyolefin is injected into the mold to form a two-layer sandwich material.

5. A method as defined in claim 1 in which there are the further steps of:

G. directing the first thermoplastic material into the mold to form a closure liner; and H. directing and injecting a compatible material from the second channel into the mold to form a thermoplastic body for the closure liner resulting in a one-piece two-material closure.

6. A method as defined in claim 1 in which there are further steps of:

I. directing and injecting the first thermoplastic material into a mold to form a closure liner; and J. directing and injecting a dissimilar material from the second channel into the mold to form a thermoplastic body for the closure liner, resulting in a two-piece two-material closure.

7. A method as defined in claim 1 in which the valve member is a shuttle ball.

8. A method as defined in claim 1 in which the valve member is a swing gate that pivots from a fixed point in the common exit cavity where the end of the gate is attached to swing from one exit end to the other exit end of the channels.

9. A method as defined in claim 1 in which there is provided the further steps of:
K. directing the first thermoplastic material into the mold to form an outer layer of the final article;
L. directing the injection of a second foamed thermoplastic core material from the second channel into the mold to form a foamed core article; and
M. directing the first thermoplastic material into the mold to form a layer and seal off the foamed material at the gate and form the final article.

10. A hot runner injection molding apparatus for coinjecting two thermoplastic materials sequentially through separate channels to form at least a two-layer sandwich material, each channel being independently heated and each channel having an exit end in communication with a common exit cavity with a common gate entrance to a forming mold, there being valve means for instantaneously switching flow of thermoplastic material from one channel to the other channel without intermixing materials from the two channels, the valve means being disposed within the common exit cavity between the exit ends of the channels, the valve means comprising a shuttle member that removes residual material from the common gate entrance and seats in the exit end of one channel as material flows through the exit end of the other channel into the common exit cavity and through the common gate whereby the materials are sequentially injected into the mold.

11. An apparatus as defined in claim 10 in which there is provided means for independently heating the two channels located between and around the two channels.

12. An apparatus as defined in claim 10 in which the shuttle member is a ball.

13. An apparatus as defined in claim 10 in which the shuttle member is a swing gate, the swing gate having a first end portion integrally connected to a central portion of the common exit cavity, the swing gate having another end portion that pivots at the first end portion to swing from the exit end of one channel to the other channel of the other channel end.

14. An apparatus as defined in claim 10 in which the forming mold is an injection mold.

15. An apparatus as defined in claim 10 in which there is further provided means for molding the two thermoplastic materials into a two-piece closure, the one material forming the closure shell and the other dissimilar material forming a liner therefor.

16. An apparatus as defined in claim 10 in which there is further provided a means for molding the two thermoplastic materials into a one-piece closure, the one material forming the closure shell or body and the compatible material forming the liner thereof.

17. An apparatus as defined in claim 10 in which there is further means for making a foam core comprising means for extruding a skin of the first thermoplastic material and means for providing a foam interior of the second thermoplastic material inside of the skin material to form a foam core, resulting in sink free articles.

* * * * *

UNITED STATES PATENT AND TRADEMARK OFFICE
CERTIFICATE OF CORRECTION

PATENT NO. :   4,470,936
DATED      :   September 11, 1984
INVENTOR(S) :  Terry C. Potter It is certified that error appears in the above–identified patent and that said Letters Patent are hereby corrected as shown below:

Column 5, line 35 (Claim 10) after "the" the phase

-- common exit cavity and -- was inadvertently omitted.

Signed and Sealed this

Sixteenth Day of July 1985

[SEAL]

Attest:

DONALD J. QUIGG

Attesting Officer   Acting Commissioner of Patents and Trademarks